United States Patent [19]
Dryden

[11] 3,738,360
[45] June 12, 1973

[54] UNITARY DISPOSABLE CIRCLE ABSORPTION CANISTER ASSEMBLY

[76] Inventor: Gale E. Dryden, 5835 North Tacoma Avenue, Indianapolis, Ind. 46220

[22] Filed: Apr. 7, 1971

[21] Appl. No.: 132,082

Related U.S. Application Data

[63] Continuation-in-part of Ser. No. 684,005, Nov. 17, 1967, abandoned, and a continuation of Ser. No. 775,761, Nov. 14, 1968, abandoned.

[52] U.S. Cl. .............................................. 128/188
[51] Int. Cl. ............................................ A61m 17/00
[58] Field of Search .................. 128/188, 191, 142.6

[56] References Cited
UNITED STATES PATENTS

| | | | |
|---|---|---|---|
| 3,566,867 | 3/1971 | Dryden | 128/188 |
| 2,837,413 | 6/1958 | Hay | 128/188 |
| 1,474,205 | 11/1923 | Mase | 128/191 |
| 2,868,198 | 1/1959 | Brooke | 128/188 |
| 2,144,479 | 1/1939 | Bloomheart | 128/188 |
| 3,171,411 | 3/1965 | Levine | 128/188 |
| 2,586,670 | 2/1952 | Lambertson | 55/387 |
| 2,918,356 | 12/1959 | Hay | 128/188 |
| 2,931,357 | 4/1960 | Arborelieus | 128/191 |
| 3,088,810 | 5/1963 | Hay | 128/188 |
| 3,240,567 | 3/1966 | Caparreli | 128/188 |

*Primary Examiner*—Richard A. Gaudet
*Assistant Examiner*—G. F. Dunne
*Attorney*—Woodard, Weikart, Emhardt & Naughton

[57] ABSTRACT

A circle absorption system for anesthesia, including a gas machine, a carbon dioxide absorbing canister assembly with corrugated inner wall surface, a gas supply hose thereto, rebreathing hoses and a mask connected thereto, a manometer and pressure relief valve connected thereto, an absorbing medium therein, and one-way valves mounted therein, the canister assembly with absorbing medium and valves being disposable. A venting device, various partition mounts, and accessory connection fittings are arranged for versatility and convenience in use.

2 Claims, 7 Drawing Figures

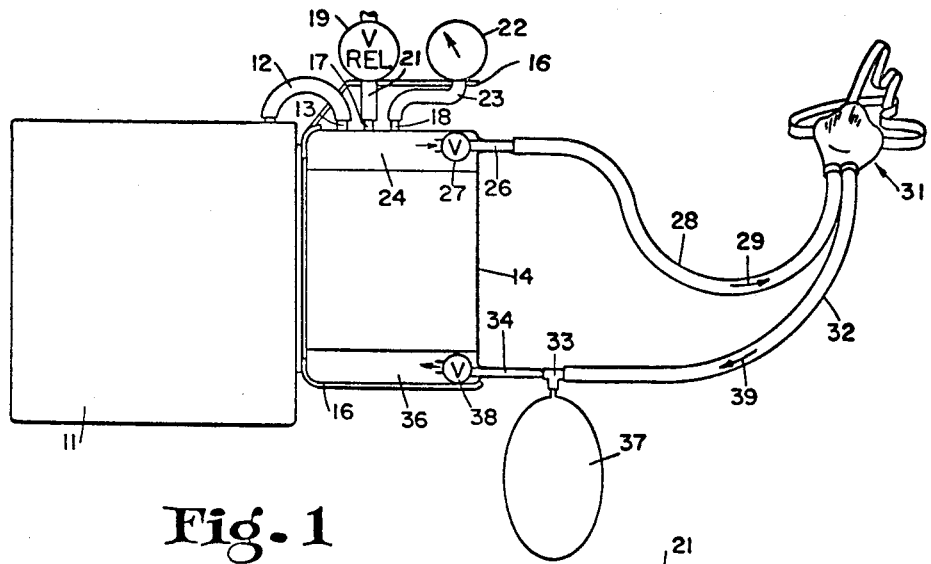
Fig. 1
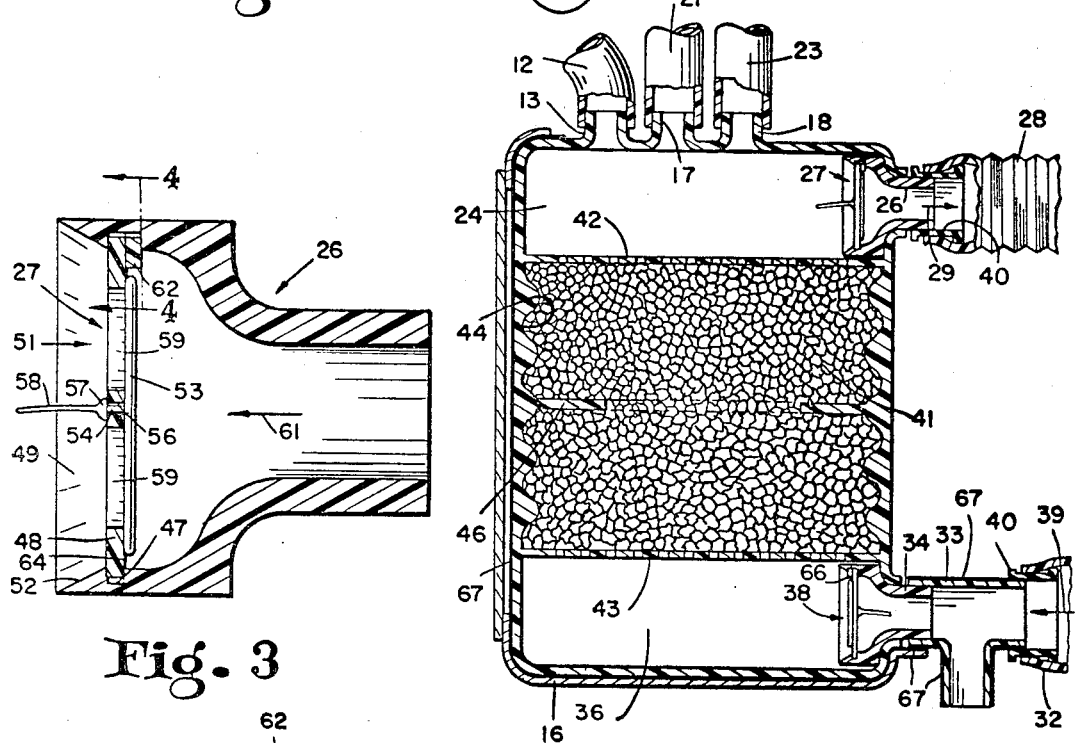
Fig. 3
Fig. 2
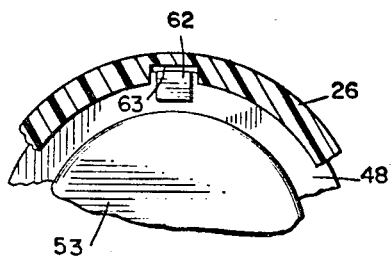
Fig. 4
GALE E. DRYDEN
Woodard, Weikart,
Emhardt & Naughton

INVENTOR
GALE E. DRYDEN

UNITARY DISPOSABLE CIRCLE ABSORPTION CANISTER ASSEMBLY

CROSS REFERENCE TO RELATED APPLICATIONS

This application is a continuation-in-part of my application of the same title, Ser. No. 684,005, filed Nov. 17, 1967 and a continuation of my application of the same title, Ser. No. 775,761, filed Nov. 14, 1968, now abandoned;

BACKGROUND OF THE INVENTION

1. Field of the Invention

This invention relates generally to anesthesia apparatus and more particularly to features thereof facilitating sterile technique in anesthesia.

2. Description of the Prior Art

In anesthesia, it is important to be able to sterilize equipment between a case involving one patient, and the next case involving another patient. Some of the equipment presently used with circle absorber systems can be adequately sterilized by use of an Autoclave or some other sterilizing apparatus, or both. However, it is usually impossible to adequately sterilize the canister components. Although there are replaceable packs of absorbent material insertable in conventional canisters, the rest of the canister components are typically made of a heavy metal structure permanently mounted to the anesthesia machine and costing between $250.00 and $300.00 so no readily expendable. Moreover, they are not readily sterilized.

The present invention overcomes this disadvantage of typical prior art by providing a low-cost disposable assembly.

SUMMARY

Described briefly, in a typical embodiment of the present invention, a disposable canister assembly includes upper and lower chambers with an intermediate chamber therebetween containing absorbent material for carbon dioxide. A one-way valve is mounted in the upper chamber, being received in a fitting mounted in the wall thereof and to which a rebreathing hose is mounted. Similarly, a one-way valve is mounted in a fitting in the lower chamber with the other rebreathing hose mountable thereto. One small fitting is provided in each the upper and lower chamber for reception of hoses to a manometer, a pressure relief valve, and the gas machine. One large fitting is also provided in each upper and lower chamber for mounting the breathing bag at either position depending upon the position of the canister. The entire canister assembly is disposable.

BRIEF DESCRIPTION OF THE DRAWING

The full nature of the invention will be understood from the accompanying drawings and the following description and claims.

FIG. 1 is a schematic diagram of a circle absorption system incorporating one embodiment of the present invention therein.

FIG. 2 is an enlarged cross-section through the disposable canister assembly of FIG. 1.

FIG. 3 is a further enlarged cross-section through a one-way valve assembly component of the canister assembly according to the typical embodiment.

FIG. 4 is a fragmentary section taken at line 4—4 in FIG. 3 and viewed in the direction of the arrows and illustrating means for preventing inadvertent erroneous mounting of a one-way valve.

DESCRIPTION OF THE PREFERRED EMBODIMENT

Figure 5:
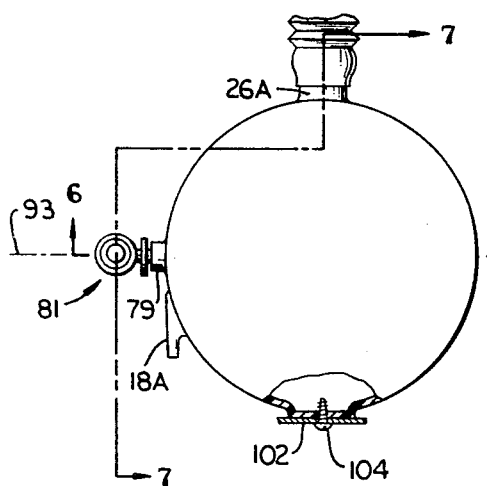
FIG. 5 is a top plan view showing another embodiment.

Referring now to the drawing in detail, and more particularly to FIG. 1, the anesthesia machine (sometimes referred to as "gas" machine) is shown on a much reduced scale at 11. It is of conventional construction and provides a desirable mixture of anesthetic gases through the hose 12 to a fitting 13 integrally mounted in the case 14 of the cannister assembly of the present invention. The canister assembly is removably supported on the gas machine by a steel bracket 16 shown schematically and mounted permanently to the gas machine. Two other hollow tubular stems 17 and 18 are mounted to the case 14 like stem 13. A pressure relief valve 19 is mounted by suitable hose 21 to the stem 17 and a manometer 22 is mounted by a suitable hose 23 to the stem 18. The manometer and pressure relief valve may be affixed permanently to the steel bracket 16 so that the cannister can be removed without disturbing them, by simply disconnecting the hoses 21 and 23. These hoses can be discarded after one case or can be conveniently sterilized.

As shown schematically, the three stems 13, 17 and 18 communicate with an upper chamber 24 in the cannister assembly having an outlet fitting 26 with a one-way valve 27 mounted therein to permit flow through rebreathing hose 28 in the direction of arrow 29 only. The face mask is provided at 31 and the other rebreathing hose 32 extends therefrom to a Tee fitting 33 which is mounted to another fitting 34 similar to fitting 26 and mounted integrally with the cannister wall 14 and communicating with a lower chamber 36 therein. A rebreathing bag 37 is connected to the Tee fitting 33. A one-way valve 38 according to the present invention is mounted in fitting 34 and oriented to permit flow in the rebreathing tube 32 in the direction of arrow 39 only. As better shown in FIG. 2, conductive rubber adapters 40 are used to connect the rebreathing hoses 28 and 32 to fitting 26 and Tee connector 33 respectively.

Referring further to FIG. 2, an additional chamber 41 with a carbon dioxide absorbent material therein is disposed between the chambers 24 and 26. An example of the material is barium hydroxide lime in pellet form. It is confined between two bulkheads 42 and 43, appropriately apertured to allow passage of gas therethrough. The internal wall of the cannister case is uneven as shown, with some of the pellets or granules of the absorbent material received in the circular grooves as shown at 44, for example. This is intended to encourage uniformity of gas flow up through the absorbent material across the entire diameter of the case from wall to wall thereof, and discourage more rapid gas flow at the wall. An inwardly projecting shelf or flange 46 is also provided for this purpose.

Referring now to FIGS. 3 and 4, additional details of the valve assembly 27 are illustrated. The valve body or fitting 26 has annular internal groove 47 therein receiving valve seat disk 48 which is pushed into the groove by pushing it through the opening 49 in the direction of the arrow 51. As it enters the tapered entry surface 52, the valve disk expands it sufficiently for the valve disk to snap over the edges into the groove 47. This disk has a typical umbrella valve member 53 mounted thereon and which is normally made of a rubber material extending over the face of the disk and having an integral stem 54 received through a central aperture 56 in the disk. The stem has a knob 57 therein to retain the flat sealing portion on the disk after the stem is pulled through the central opening 56 by means of the tab 58. Such valve construction is well known and the umbrella flap normally closes apertures 59 through the disk to prevent flow in the direction of the arrow 61, but accommodate flow in the direction of the arrow 51. Because this particular valve assembly is intended to permit flow in the system in the direction of the arrow 29 (FIGS. 1 and 2) there must be certainty that it is installed properly.

To be sure that the disk is properly oriented in the fitting 26, a lug 62 is provided thereon extending axially therefrom and received in a pocket 63 projecting axially form the shoulder 64 of the fitting 26. Consequently the disk can be installed only when the lug 62 is in registry with the cavity or recess 63.

Because the disk in valve 38 must be installed so that the flow therethrough is in the opposite direction to that in valve 27, the recess or notch in the groove of the corresponding fitting 34 is located to the left-hand side of the disk as at 66. Therefore the disk cannot be mounted in the direction shown in FIG. 3, so there is no chance of error.

As is well known, it is extremely undesirable and indeed hazardous to tolerate accumulations of static electricity in apparatus for anesthesia. Therefore, in addition to using conductive rubber at appropriate places, such as the adapters 40, for example, conductive strips are provided on various components as indicated schematically at 67. Although the thickness thereof is shown in exaggerated form on the drawings, it can be virtually negligible, conductive paints or deposits being suitable for this purpose. Such conductive strips are desirable because the case, the bulkheads, the stems and fittings used are all of a plastic material in the disposable assembly. After use of the assembly with one patient has been completed, the entire unit, from the stems communicating with the upper chamber, to the bottom of the lower chamber, and including the fittings 26 and 34 integral with the cannister assembly, and the valves therein, are to be thrown away as a unit. In fact, they are preferably inseparable from each other without destruction of the assembly.

In FIG. 2 there is shown schematically a steel bracket 16 by means of which the cannister assembly can be mounted to a gas machine. A variety of such brackets might be employed, so long as they have in common the feature of facilitating installation and removal of the cannister assembly therefrom and the ability to provide an electrical ground connection to the gas machine.

Figure 6:
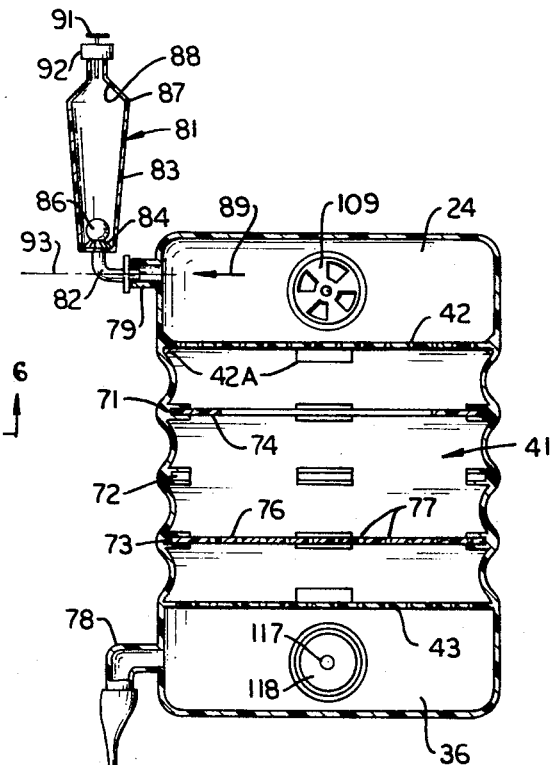
FIG. 6 is a section taken at line 6—6 in FIG. 5 and viewed in the direction of the arrows.
Figure 7:
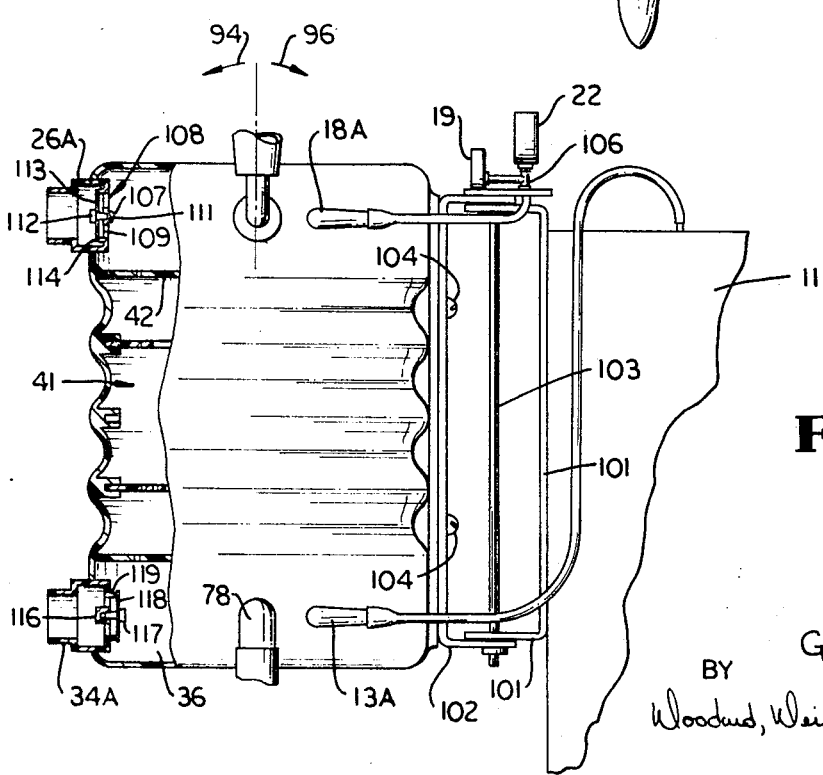
FIG. 7 is a partially sectioned view taken at line 7—7 in FIG. 5 and viewed in the direction of the arrows.

Referring now to FIGS. 5 and 6, showing the alternate embodiment, fittings 13A and 18A are substituted for fittings 13, 17, and 18 of FIGS. 1 and 2. Fitting 13A is used to admit gas to chamber 36 from the gas machine. Fitting 18A is coupled to a Tee fitting 106 connected to the manometer 22 and relief valve 19. The inlet and outlet fittings are located just as they are in FIG. 2, and the same reference numerals but with postscripts are applied to these fittings. The valves therein will be described hereinafter. As shown in FIG. 7, a C-shaped bracket 101 may be provided on the gas machine, and a similar bracket 102 is mounted thereto for pivoting on the vertical shaft axis 103. The canister has two screws 104 in the wall thereof, with the screw heads spaced from the canister wall so that the screw shanks are readily received in keyslot-shaped apertures in bracket 102. Therefore, after use, the canister can be readily removed from the gas machine for disposal.

As in the embodiment of FIGS. 1 and 2, the embodiment of FIGS. 5 and 6 has two bulkheads 42 and 43 appropriately perforated to permit passage of gas therethrough, but serving to prevent the absorbent material from entering either the chamber 24 or chamber 36. Bulkhead 42 rests on a group of circularly spaced ledges 42A and the upper edge is plastic-welded to the case. This arrangement permits factory filling with absorbent material followed by installation and welding of the bulkhead 42. If desired, however, a fill opening and plug therefor can be provided in the wall of the canister immediately below the upper mounting screw 104 for factory filling with the absorbent material.

The wall of chamber 41 between the bulkheads is of serpentine cross section and, in the illustrated embodiment, has a plurality of vertically spaced grooves 71, 72, and 73 therein. These grooves may extend throughout the entire circumference or they may be provided at circularly spaced intervals around the circumference of the canister as shown. These grooves are useful for two purposes. A baffle ring 74 can be provided in the groove 71 to serve the same purpose as the flange 46 in the embodiment of FIG. 2, avoiding channeling of the absorbent material along the wall of the canister. They can also serve as a convenient support for a partition such as 76 in the groove 73, this partition having appropriate perforations 77 therein to permit passage of gas therethrough. However, the partition perforations are small enough to prevent passage of the absorbent material therethrough. Accordingly, as shown in the embodiment of FIG. 6, the absorbent material does not extend the whole height from bulkhead 43 to bulkhead 42, but rather only down from bulkhead 42 to the top of the partition 76. Because of this arrangement and the three possible grooves in which the partition 76 could be located, including groove 71 if the flange 74 is omitted, the amount of absorbent material can be selected to enable use of the canister for a desired period of time. In other words, although it is desirable to manufacture the canister in the same overall dimensions for virtually all uses, there will be no need for the complete filling of a canister from bulkhead 43 to 42 if the canister is to be used for only a comparatively short period of time or for small patients, such as children, for example. In that event, for canisters to be used for periods of anesthesia of comparatively short duration, the partition can be located in the groove 71 and the canister filled with absorbent material only between the bulkhead 42 and partition 76 in groove 71. For a longer duration of usage, the partition can be located in groove 72 and filled with absorbent material up to bulkhead 42. So it is seen that the present invention, by providing the various grooves 71, 72, and 73 in parallel vertically spaced relationship, permits the use of the same basic canister assembly for an assortment of units of various absorbing capacities, depending upon the location of the partition 76 and the amount of fill of absorbent material.

Another feature of the embodiment of FIGS. 5 and 6, is the elbow fitting 78 projecting outwardly and downwardly from the lower chamber 36. The rebreathing bag 37 is mounted to this fitting and, being located directly under fitting 79 which is at 90° with respect to the fitting 26A, the rebreathing bag is located conveniently at the right hand of the anesthesiologist while administering the anesthetic to a patient. With the rebreathing bag located in direct communication with chamber 36, the valving in the face mask 31 as employed with the embodiments of FIGS. 1 and 2 can be conveniently omitted, if desired. In other words, a face mask without directional valves can be employed with the embodiment of FIGS. 5 and 6.

An additional feature of the embodiment of FIGS. 5 and 6 is the venting device 81. This is mounted by a suitable connector coupling 82 received in the fitting 79 communicating with chamber 24. The device includes a column 83 having a serrated support 84 at the bottom for a float ball 86. The column is of transparent plastic so the location of the ball therein can be observed. There is minimal clearance between the periphery of the ball and the inner surface of the column near the base 84. However the inner wall of the column or passageway 83 diverges toward the point 87, whereupon it again converges but rather sharply to provide a conical seat 88. Therefore, as gas is admitted to the chamber 36 from the gas machine and flows upward through the canister, some flow will be produced in the direction of arrow 89 into the coupling 82 and thence upward in the column 83. This will cause the ball 86 to rise at a decreasing rate as the cross sectional clearance between the ball and the inner surface of the column increases. However the velocity of the ball moving toward the seat 88 will cause it to eventually close and remain closed thereafter during use of the equipment. A spring loaded plunger 91 is provided in the vent cap 92 of the column 83 to enable dislodging the ball in the event it should happen to become wedged on the seat 88.

The size of the venting device and the density of the ball 86 will be selected as desired to obtain the most satisfactory closure rate. As an example, it can be arranged such that a flow through the coupling at a rate of eight liters per minute will shut it off. Adjustment of the performance of this unit can be achieved by simply rotating it a few degrees about the axis 93 of the coupling portion received in the fitting 79. The upper end of the device can be moved in the direction of arrow 94 or 96 for this purpose and to the extent desired.

Instead of using a divergent wall in the column in the venting device for an increasing cross sectional bypass around the ball, elongated grooves could be provided in a cylindrical internal wall.

If it is desired to use the canister in an inverted position for left-handed administration, the device 87 and rebreathing bag 37 are reversed from their respective fittings 78 and 79, using appropriate adapter fittings for proper orientation.

One feature of the embodiment of FIGS. 5, 6 and 7 is the fact that by having the canister mounting screws of metal, they serve as a convenient electrically conductive path making an electrical ground from the canister through the screws and brackets to the gas machine. They can extend through the wall to the interior, as shown, if desired.

The valves in the inlet and outlet fittings of FIGS. 5, 6 and 7 are somewhat different from those previously described. Referring to fitting 26A, a socket 107 is supported centrally in aperture 108 by the radially extending ribs 109. This socket has a blind central hole 111 with tapered wall receiving the tapered pin 112. This pin, which becomes snug without bottoming in the blind hole, retains the flexible valve disk 113 on the annular seat 114 lying in a vertical plane. The action of the disk during patient respiration is horizontal with respect to the seat 114, and therefore uniform and constant in nature. These valves and this arrangement of them are an important advantage from the standpoint of safety, in contrast with conventional canisters relying on gravity for valve action and which can cause problems if not positioned carefully.

The valve arrangement in fitting 34A is similar, with the blind socket 116 receiving pin 117 retaining the valve disk 118 on seat 119. The blind holes prevent the pins and disks from being mounted on the wrong side of the support ribs. By having the gas from the gas machine admitted to the inlet chamber of the canister, it can pick up moisture from the absorbent material, before reaching the patient. This is a very desirable feature.

While the invention has been disclosed and described in some detail in the drawings and foregoing description, they are to be considered as illustrative and not restrictive in character, as other modifications may readily suggest themselves to persons skilled in this art and within the broad scope of the invention, reference being made to the appended claims.

The invention claimed is:

1. The combination comprising:
   container means having first, second, and third chambers therein, said second chamber being adjacent to said first and third chambers, a first inlet fitting in said container means communicating with said first chamber, a first outlet fitting in said container means communicating with said third chamber, said first chamber communicating with said third chamber through said second chamber, an absorbent material for carbon dioxide disposed in said second chamber, a plurality of additional fittings in said container means communicating with said chambers, and an anesthesia machine having means receiving said container means thereon, said container means being removable from said anesthesia machine and completely disposable;
   a venting device having mounting means mounted to one of said additional fittings communicating with said third chamber, said venting device including a valve arranged for closure thereof by a flow of gas therethrough from said third chamber;
   said venting device valve having a float movable in a passageway between a rest and a seat, said passageway having different cross sectional clearance area with respect to said float at increasing distances from said rest.

2. The combination of claim 1 wherein:
   said venting device is movably mounted to said container means for providing various inclinations of said passageway in said container means.

* * * * *

Disclaimer 3,738,360.—*Gale E. Dryden*, Indianapolis, Ind. UNITARY DISPOSABLE CIRCLE ABSORPTION CANISTER ASSEMBLY. Patent dated June 12, 1973. Disclaimer filed Mar. 30, 1973, by the inventor.

Hereby disclaims the portion of the term of the patent subsequent to Mar. 2, 1988.

[*Official Gazette October 23, 1973.*]

UNITED STATES PATENT OFFICE
CERTIFICATE OF CORRECTION

Patent No. 3,738,360          Dated June 12, 1973

Inventor(s) Gale E. Dryden

It is certified that error appears in the above-identified patent and that said Letters Patent are hereby corrected as shown below:

In Item 63 (Related U.S. Application Data) it should read --Continuation-in-part of 684,005, November 17, 1967, now patent No. 3,566,867, issued March 2, 1971, and a continuation of Serial No. 775,761, November 14, 1968, abandoned.--

Column 2, line 52, "26" should be --36--.

Column 3, line 23, "form" should be --from--.

Signed and sealed this 7th day of May 1974.

(SEAL)
Attest:

EDWARD M.FLETCHER,JR.                C. MARSHALL DANN
Attesting Officer                    Commissioner of Patents